United States Patent
Ashworth et al.

(10) Patent No.: US 10,674,526 B2
(45) Date of Patent: Jun. 2, 2020

(54) LOCATION BASED ACCESS TO SELECTED COMMUNICATION BANDS

(71) Applicant: WILSON ELECTRONICS, LLC, St. George, UT (US)

(72) Inventors: Christopher Ken Ashworth, St. George, UT (US); Patrick Lee Cook, Cedar City, UT (US); Michael James Mouser, Parker, TX (US)

(73) Assignee: WILSON ELECTRONICS, LLC, St. George, UT (US)

( * ) Notice: Subject to any disclaimer, the term of this patent is extended or adjusted under 35 U.S.C. 154(b) by 0 days.

(21) Appl. No.: 15/710,559

(22) Filed: Sep. 20, 2017

(65) Prior Publication Data

US 2018/0092114 A1    Mar. 29, 2018

Related U.S. Application Data

(60) Provisional application No. 62/399,077, filed on Sep. 23, 2016.

(51) Int. Cl.
| | | |
|---|---|---|
| *H04W 72/12* | (2009.01) | |
| *H04B 7/155* | (2006.01) | |
| *H04W 72/04* | (2009.01) | |

(52) U.S. Cl.
CPC .... *H04W 72/1252* (2013.01); *H04B 7/15542* (2013.01); *H04W 72/042* (2013.01); *H04W 72/0413* (2013.01)

(58) Field of Classification Search
CPC ......... H04W 72/1252; H04W 72/0413; H04W 72/042
See application file for complete search history.

(56) References Cited

U.S. PATENT DOCUMENTS

| | | |
|---|---|---|
| 4,776,032 A | 10/1988 | Odate et al. |
| 5,303,395 A | 4/1994 | Dayani |
| 5,737,687 A | 4/1998 | Martin et al. |
| 5,777,530 A | 7/1998 | Nakatuka |
| 5,835,848 A | 11/1998 | Bi et al. |
| 6,005,884 A | 12/1999 | Cook et al. |
| 6,711,388 B1 | 3/2004 | Neitiniemi |
| 6,889,033 B2 | 5/2005 | Bongfeldt |
| 6,990,313 B1 | 1/2006 | Yarkosky |

(Continued)

FOREIGN PATENT DOCUMENTS

| | | |
|---|---|---|
| EP | 1525678 B1 | 7/2008 |
| WO | WO 2016/109561 A1 | 7/2016 |

OTHER PUBLICATIONS

3GPP2 C.S0011-B; "Recommended Minimum Performance Standards for cdma2000® Spread Spectrum Mobile Stations"; TIA-98-E; (Dec. 13, 2002); 448 pages; Release B, V1.0, Revision E.

(Continued)

*Primary Examiner* — Jael M Ulysse
(74) *Attorney, Agent, or Firm* — Thorpe North & Western

(57) ABSTRACT

Technology for a signal booster is disclosed. The signal booster can identify a current location of the signal booster. The signal booster can determine one or more bands in which signals are permitted to be boosted by the signal booster based on the current location of the signal booster. The signal booster can boost signals in the one or more bands that are permitted to be boosted by the signal booster for the current location of the signal booster.

26 Claims, 11 Drawing Sheets

(56) References Cited

U.S. PATENT DOCUMENTS

| | | | |
|---|---|---|---|
| 7,035,587 B1 | 4/2006 | Yarkosky | |
| 7,221,967 B2 | 5/2007 | Van Buren et al. | |
| 7,480,485 B1 | 1/2009 | Oh et al. | |
| 7,974,573 B2 | 7/2011 | Dean | |
| 2002/0044594 A1 | 4/2002 | Bongfeldt | |
| 2003/0122711 A1* | 7/2003 | Panasik | G01C 21/206 342/387 |
| 2003/0123401 A1 | 7/2003 | Dean | |
| 2004/0082354 A1* | 4/2004 | Cohen | H03F 1/0288 455/522 |
| 2004/0137854 A1 | 7/2004 | Ge | |
| 2004/0146013 A1 | 7/2004 | Song et al. | |
| 2004/0147221 A1 | 7/2004 | Sheynblat et al. | |
| 2004/0166802 A1 | 8/2004 | McKay, Sr. et al. | |
| 2004/0219876 A1 | 11/2004 | Baker et al. | |
| 2004/0235417 A1 | 11/2004 | Dean | |
| 2005/0084004 A1* | 4/2005 | Bione | H04L 27/00 375/222 |
| 2005/0118949 A1 | 6/2005 | Allen et al. | |
| 2006/0084379 A1 | 4/2006 | O'Neill | |
| 2006/0172781 A1* | 8/2006 | Mohebbi | H04B 7/15535 455/571 |
| 2007/0071128 A1 | 3/2007 | Meir et al. | |
| 2007/0155314 A1* | 7/2007 | Mohebbi | H04B 7/15507 455/11.1 |
| 2007/0188235 A1 | 8/2007 | Dean | |
| 2008/0014862 A1 | 1/2008 | Van Buren et al. | |
| 2008/0081555 A1 | 4/2008 | Kong et al. | |
| 2008/0096483 A1 | 4/2008 | Van Buren et al. | |
| 2008/0227460 A1* | 9/2008 | David | H03F 3/189 370/237 |
| 2008/0278237 A1 | 11/2008 | Blin | |
| 2009/0325481 A1* | 12/2009 | Mohebbi | H04B 7/1555 455/15 |
| 2010/0176999 A1* | 7/2010 | Anguera | H01Q 1/243 343/702 |
| 2010/0311480 A1* | 12/2010 | Raines | G01S 19/03 455/575.7 |
| 2011/0087639 A1* | 4/2011 | Gurney | G06F 17/30442 707/690 |
| 2011/0151775 A1 | 6/2011 | Kang et al. | |
| 2013/0157729 A1* | 6/2013 | Tabe | H04W 52/0245 455/573 |
| 2013/0203404 A1* | 8/2013 | Cook | H04W 24/02 455/423 |
| 2013/0210341 A1* | 8/2013 | Kiyoshima | H04W 52/241 455/15 |
| 2014/0146739 A1* | 5/2014 | Zhang | H04W 92/20 370/315 |
| 2014/0269945 A1* | 9/2014 | Daniel | H04W 52/243 375/254 |
| 2014/0316616 A1* | 10/2014 | Kugelmass | G05D 1/101 701/8 |
| 2014/0321353 A1* | 10/2014 | Zhan | H04W 16/26 370/315 |
| 2015/0011157 A1* | 1/2015 | Terry | H04B 7/15535 455/10 |
| 2015/0011208 A1* | 1/2015 | Terry | H04B 7/15535 455/435.1 |
| 2015/0181390 A1* | 6/2015 | Williams | G06Q 10/10 455/456.3 |
| 2015/0223088 A1* | 8/2015 | Niu | H04W 24/08 370/252 |
| 2016/0077134 A1* | 3/2016 | Rezk | H04K 3/00 324/76.39 |
| 2016/0095002 A1* | 3/2016 | Zhan | H04B 7/15557 370/294 |
| 2016/0128068 A1* | 5/2016 | Lotter | H04W 72/0453 370/329 |
| 2016/0135059 A1* | 5/2016 | Zhan | H04W 52/243 375/254 |
| 2016/0198347 A1* | 7/2016 | Zhan | H04B 1/40 455/23 |
| 2016/0302233 A1* | 10/2016 | Gopala Krishnan | H04W 74/0833 |
| 2017/0041807 A1* | 2/2017 | Lotter | H04B 7/15507 |
| 2017/0070898 A1* | 3/2017 | Anderson | H04W 24/04 |
| 2017/0357798 A1* | 12/2017 | Khan | G06F 21/45 |

OTHER PUBLICATIONS

ADL5513; "1 MHz to 4 GHz, 80 dB Logarithmic Detector/ Controller"; Data Sheet; (2008); 12 pages; Analog Devices, Inc.

FCC.; "Use and Design of Signal Boosters Report and Order." FCC-13-21, Feb. 20, 2013; pp. 16-17, 50-77.

HMC713LP3E; "54 dB, Logarithmic Detector / Controller, 50—8000 MHz"; Data Sheet; (2010); 12 pages.

HMC909LP4E; "RMS Power Detector Single-Ended, DC—5.8 GHz"; Data Sheet; (2010); 21 pages.

PIC16F873; "28/40-Pin 8-Bit CMOS FLASH Microcontrollers"; (2001); Data Sheet; 218 pages.

PCT Application No. PCT/US2017/052532 Filing Date Sep. 20, 2017 Christopher Ken Ashworth, International Search Report dated Jan. 4, 2018.

* cited by examiner

LOCATION BASED ACCESS TO SELECTED COMMUNICATION BANDS

RELATED APPLICATIONS

The present application claims priority to U.S. Provisional Patent Application No. 62/399,077, filed Sep. 23, 2016, the entire specification of which is hereby incorporated by reference in its entirety for all purposes.

BACKGROUND

Signal boosters can be used to increase the quality of wireless communication between a wireless device and a wireless communication access point, such as a cell tower. Signal boosters can improve the quality of the wireless communication by amplifying, filtering, and/or applying other processing techniques to uplink and downlink signals communicated between the wireless device and the wireless communication access point.

As an example, the signal booster can receive, via an antenna, downlink signals from the wireless communication access point. The signal booster can amplify the downlink signal and then provide an amplified downlink signal to the wireless device. In other words, the signal booster can act as a relay between the wireless device and the wireless communication access point. As a result, the wireless device can receive a stronger signal from the wireless communication access point. Similarly, uplink signals from the wireless device (e.g., telephone calls and other data) can be directed to the signal booster. The signal booster can amplify the uplink signals before communicating, via the antenna, the uplink signals to the wireless communication access point.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
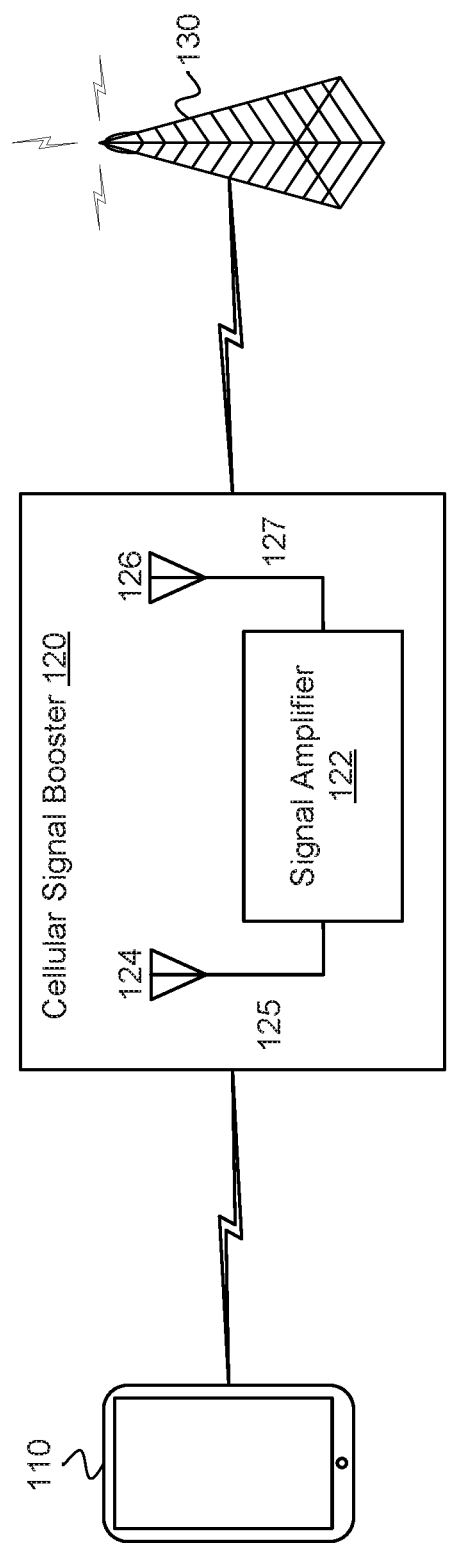
FIG. 1 illustrates a signal booster in communication with a wireless device and a base station in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

FIG. 1 illustrates an exemplary signal booster 120 in communication with a wireless device 110 and a base station 130. The signal booster 120 can be referred to as a repeater. A repeater can be an electronic device used to amplify (or boost) signals. The signal booster 120 (also referred to as a cellular signal amplifier) can improve the quality of wireless communication by amplifying, filtering, and/or applying other processing techniques via a signal amplifier 122 to uplink signals communicated from the wireless device 110 to the base station 130 and/or downlink signals communicated from the base station 130 to the wireless device 110. In other words, the signal booster 120 can amplify or boost uplink signals and/or downlink signals bi-directionally. In one example, the signal booster 120 can be at a fixed location, such as in a home or office. Alternatively, the signal booster 120 can be attached to a mobile object, such as a vehicle or a wireless device 110.

In one configuration, the signal booster 120 can include an integrated device antenna 124 (e.g., an inside antenna or a coupling antenna) and an integrated node antenna 126 (e.g., an outside antenna). The integrated node antenna 126 can receive the downlink signal from the base station 130. The downlink signal can be provided to the signal amplifier 122 via a second coaxial cable 127 or other type of radio frequency connection operable to communicate radio frequency signals. The signal amplifier 122 can include one or more cellular signal amplifiers for amplification and filtering. The downlink signal that has been amplified and filtered can be provided to the integrated device antenna 124 via a first coaxial cable 125 or other type of radio frequency connection operable to communicate radio frequency signals. The integrated device antenna 124 can wirelessly communicate the downlink signal that has been amplified and filtered to the wireless device 110.

Similarly, the integrated device antenna 124 can receive an uplink signal from the wireless device 110. The uplink signal can be provided to the signal amplifier 122 via the first coaxial cable 125 or other type of radio frequency connection operable to communicate radio frequency signals. The signal amplifier 122 can include one or more cellular signal amplifiers for amplification and filtering.

The uplink signal that has been amplified and filtered can be provided to the integrated node antenna 126 via the second coaxial cable 127 or other type of radio frequency connection operable to communicate radio frequency signals. The integrated device antenna 126 can communicate the uplink signal that has been amplified and filtered to the base station 130.

In one example, the signal booster 120 can filter the uplink and downlink signals using any suitable analog or digital filtering technology including, but not limited to, surface acoustic wave (SAW) filters, bulk acoustic wave (BAW) filters, film bulk acoustic resonator (FBAR) filters, ceramic filters, waveguide filters or low-temperature co-fired ceramic (LTCC) filters.

In one example, the signal booster 120 can send uplink signals to a node and/or receive downlink signals from the node. The node can comprise a wireless wide area network (WWAN) access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or another type of WWAN access point.

In one configuration, the signal booster 120 used to amplify the uplink and/or a downlink signal is a handheld booster. The handheld booster can be implemented in a sleeve of the wireless device 110. The wireless device sleeve can be attached to the wireless device 110, but can be removed as needed. In this configuration, the signal booster 120 can automatically power down or cease amplification when the wireless device 110 approaches a particular base station. In other words, the signal booster 120 can determine to stop performing signal amplification when the quality of uplink and/or downlink signals is above a defined threshold based on a location of the wireless device 110 in relation to the base station 130.

In one example, the signal booster 120 can include a battery to provide power to various components, such as the signal amplifier 122, the integrated device antenna 124 and the integrated node antenna 126. The battery can also power the wireless device 110 (e.g., phone or tablet). Alternatively, the signal booster 120 can receive power from the wireless device 110.

In one configuration, the signal booster 120 can be a Federal Communications Commission (FCC)-compatible consumer signal booster. As a non-limiting example, the signal booster 120 can be compatible with FCC Part 20 or 47 Code of Federal Regulations (C.F.R.) Part 20.21 (Mar. 21, 2013). In addition, the signal booster 120 can operate on the frequencies used for the provision of subscriber-based services under parts 22 (Cellular), 24 (Broadband PCS), 27 (AWS-1, 700 MHz Lower A-E Blocks, and 700 MHz Upper C Block), and 90 (Specialized Mobile Radio) of 47 C.F.R. The signal booster 120 can be configured to automatically self-monitor its operation to ensure compliance with applicable noise and gain limits. The signal booster 120 can either self-correct or shut down automatically if the signal booster's operations violate the regulations defined in FCC Part 20.21.

In one configuration, the signal booster 120 can improve the wireless connection between the wireless device 110 and the base station 130 (e.g., cell tower) or another type of wireless wide area network (WWAN) access point (AP). The signal booster 120 can boost signals for cellular standards, such as the Third Generation Partnership Project (3GPP) Long Term Evolution (LTE) Release 8, 9, 10, 11, 12, or 13 standards or Institute of Electronics and Electrical Engineers (IEEE) 802.16. In one configuration, the signal booster 120 can boost signals for 3GPP LTE Release 13.0.0 (March 2016) or other desired releases. The signal booster 120 can boost signals from the 3GPP Technical Specification 36.101 (Release 12 Jun. 2015) bands or LTE frequency bands. For example, the signal booster 120 can boost signals from the LTE frequency bands: 2, 4, 5, 12, 13, 17, and 25. In addition, the signal booster 120 can boost selected frequency bands based on the country or region in which the signal booster is used, including any of bands 1-70 or other bands, as disclosed in ETSI TS136 104 V13.5.0 (2016-10).

The number of LTE frequency bands and the level of signal improvement can vary based on a particular wireless device, cellular node, or location. Additional domestic and international frequencies can also be included to offer increased functionality. Selected models of the signal booster 120 can be configured to operate with selected frequency bands based on the location of use. In another example, the signal booster 120 can automatically sense from the wireless device 110 or base station 130 (or GPS, etc.) which frequencies are used, which can be a benefit for international travelers.

In one example, the integrated device antenna 124 and the integrated node antenna 126 can be comprised of a single antenna, an antenna array, or have a telescoping form-factor. In another example, the integrated device antenna 124 and the integrated node antenna 126 can be a microchip antenna. An example of a microchip antenna is AMMAL001. In yet another example, the integrated device antenna 124 and the integrated node antenna 126 can be a printed circuit board (PCB) antenna. An example of a PCB antenna is TE 2118310-1.

In one example, the integrated device antenna 124 can receive uplink (UL) signals from the wireless device 100 and transmit DL signals to the wireless device 100 using a single antenna. Alternatively, the integrated device antenna 124 can receive UL signals from the wireless device 100 using a dedicated UL antenna, and the integrated device antenna 124 can transmit DL signals to the wireless device 100 using a dedicated DL antenna.

In one example, the integrated device antenna 124 can communicate with the wireless device 110 using near field communication. Alternatively, the integrated device antenna 124 can communicate with the wireless device 110 using far field communication.

In one example, the integrated node antenna 126 can receive downlink (DL) signals from the base station 130 and transmit uplink (UL) signals to the base station 130 via a single antenna. Alternatively, the integrated node antenna 126 can receive DL signals from the base station 130 using a dedicated DL antenna, and the integrated node antenna 126 can transmit UL signals to the base station 130 using a dedicated UL antenna.

In one configuration, multiple signal boosters can be used to amplify UL and DL signals. For example, a first signal booster can be used to amplify UL signals and a second signal booster can be used to amplify DL signals. In addition, different signal boosters can be used to amplify different frequency ranges.

In one configuration, the signal booster 120 can be configured to identify when the wireless device 110 receives a relatively strong downlink signal. An example of a strong downlink signal can be a downlink signal with a signal strength greater than approximately −80 dBm. The signal booster 120 can be configured to automatically turn off selected features, such as amplification, to conserve battery life. When the signal booster 120 senses that the wireless device 110 is receiving a relatively weak downlink signal, the integrated booster can be configured to provide amplification of the downlink signal. An example of a weak downlink signal can be a downlink signal with a signal strength less than −80 dBm.

In one example, the signal booster 120 can also include one or more of: a waterproof casing, a shock absorbent casing, a flip-cover, a wallet, or extra memory storage for the wireless device. In one example, extra memory storage can be achieved with a direct connection between the signal booster 120 and the wireless device 110. In another example, Near-Field Communications (NFC), Bluetooth v4.0, Bluetooth Low Energy, Bluetooth v4.1, Bluetooth v4.2, Bluetooth 5, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, or IEEE 802.11ad can be used to couple the signal booster 120 with the wireless device 110 to enable data from the wireless device 110 to be communicated to and stored in the extra memory storage that is integrated in the signal booster 120. Alternatively, a connector can be used to connect the wireless device 110 to the extra memory storage.

In one example, the signal booster 120 can include photovoltaic cells or solar panels as a technique of charging the integrated battery and/or a battery of the wireless device 110. In another example, the signal booster 120 can be configured to communicate directly with other wireless devices with signal boosters. In one example, the integrated node antenna 126 can communicate over Very High Frequency (VHF) communications directly with integrated node antennas of other signal boosters. The signal booster 120 can be configured to communicate with the wireless device 110 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band. Examples of such ISM bands include 2.4 GHz, 3.6 GHz, 4.9 GHz, 5 GHz, or 5.9 GHz. This configuration can allow data to pass at high rates between multiple wireless devices with signal boosters. This configuration can also allow users to send text messages, initiate phone calls, and engage in video communications between wireless devices with signal boosters. In one example, the integrated node antenna 126 can be configured to couple to the wireless device 110. In other words, communications between the integrated node antenna 126 and the wireless device 110 can bypass the integrated booster.

In another example, a separate VHF node antenna can be configured to communicate over VHF communications directly with separate VHF node antennas of other signal boosters. This configuration can allow the integrated node antenna 126 to be used for simultaneous cellular communications. The separate VHF node antenna can be configured to communicate with the wireless device 110 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band.

In one configuration, the signal booster 120 can be configured for satellite communication. In one example, the integrated node antenna 126 can be configured to act as a satellite communication antenna. In another example, a separate node antenna can be used for satellite communications. The signal booster 120 can extend the range of coverage of the wireless device 110 configured for satellite communication. The integrated node antenna 126 can receive downlink signals from satellite communications for the wireless device 110. The signal booster 120 can filter and amplify the downlink signals from the satellite communication. In another example, during satellite communications, the wireless device 110 can be configured to couple to the signal booster 120 via a direct connection or an ISM radio band. Examples of such ISM bands include 2.4 GHz, 3.6 GHz, 4.9 GHz, 5 GHz, or 5.9 GHz.

In one example, Part 20 of the Consumer Booster Standard specifies a number of bands in which signals are permitted to be boosted by a signal booster. For example, band 5 and band 26 are exemplary bands in which signals are permitted to be boosted by a signal booster. In other words, cellular signals that fall under band 5 or band 26 can be boosted (e.g., amplified) by the signal booster. Band 5 operates between 824 megahertz (MHz) and 849 MHz in uplink (UL), and between 869 MHz and 894 MHz in downlink (DL). Band 26 operates between 814 MHz and 849 MHz in uplink, and between 859 MHz and 894 MHz in downlink. In other words, band 26 includes an additional 10 MHz in the downlink and the uplink as compared to band 5, so band 5 is a subset of band 26.

In one example, the additional 10 MHz for band 26 (i.e., 814 MHz to 824 MHz in the uplink and 859 MHz to 869 MHz in the downlink) was originally used for public safety purposes. However, as cellular traffic has increased over the years, the Federal Communications Commission (FCC) has reallocated this additional 10 MHz for cellular traffic instead of for public safety. In other words, the FCC extended band 5 by 10 MHz in both downlink and uplink, and this extended range is referred to as band 26. This reallocation of the 10 MHz from public safety to cellular traffic for the creation of band 26 is referred to as a rebanding of band 26. For public safety users and transmitters that used this 10 MHz for public safety, the FCC has provided an alternative frequency range for public safety. The public safety users and transmitters operate across the United States, Canada and Mexico. Based on the rebanding, each region must purchase new equipment or upgrade existing equipment that is compatible with the alternative frequency range for public safety. By the public safety users switching to the alternative frequency range for public safety, the 10 MHz can be fully utilized for cellular traffic in band 26.

In one example, the rebanding is an ongoing process, and while the rebanding has been completed in certain areas (e.g., the United States), other areas (e.g., Canada and Mexico) have not yet completed the rebanding. When rebanding has not been completed in a particular region (e.g., Canada and Mexico), band 26 cannot be utilized for cellular traffic in that particular region since the public safety users are still using the 10 MHz for public safety. On the other hand, when rebanding has been completed in a particular region (e.g., United States), band 26 can be used for cellular traffic in that particular region since all of the public safety users have switched over to the alternative frequency range for public safety.

In one example, a signal booster operating in the United States can operate in band 26. In other words, since the rebanding has been completed in the United States, the signal booster is permitted to amplify signals in band 26. However, if the signal booster is located in proximity to the Canadian or Mexican border (i.e., regions in which the rebanding has not yet been completed), the signal booster cannot operate in band 26. In this example, a signal booster that cannot operate in band 26 (due to its location), the signal booster can revert back to operating at a default band (e.g., band 5).

As explained in further detail below, the signal booster can determine its location. Based on the location, the signal booster can determine a band in which the signal booster is permitted to amplify signals. Then, the signal booster can amplify signals only in the band permitted for the location.

Figure 2A:
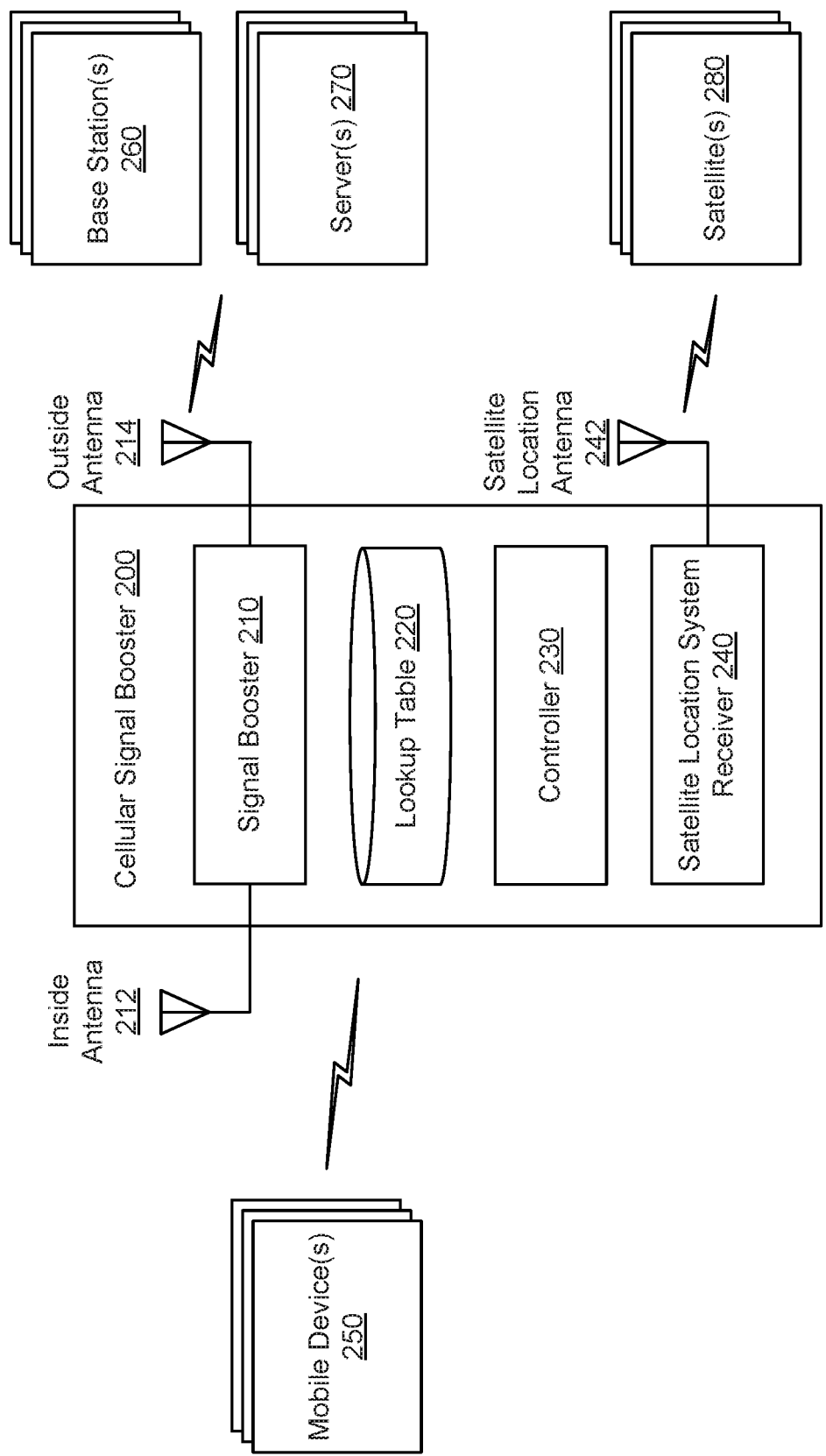
FIG. 2A illustrates a cellular signal booster operable to boost signals in one or more bands that are permitted to be boosted by the cellular signal booster for a current location of the cellular signal booster in accordance with an example.

FIG. 2A illustrates an exemplary cellular signal booster 200 operable to boost signals in one or more bands that are permitted to be boosted by the cellular signal booster 200 for a current location of the cellular signal booster 200. The cellular signal booster 200 can include a signal booster 210, a lookup table 220, a controller 230 and a satellite location system receiver 240, such as a global positioning system (GPS) receiver. The signal booster 200 can be an industrial signal booster or a consumer signal booster. The signal booster 210 can be coupled to an inside antenna 212 and an outside antenna 214. The satellite location system receiver 240 can be coupled to a satellite location antenna 242, such as a GPS antenna.

Figure 2B:
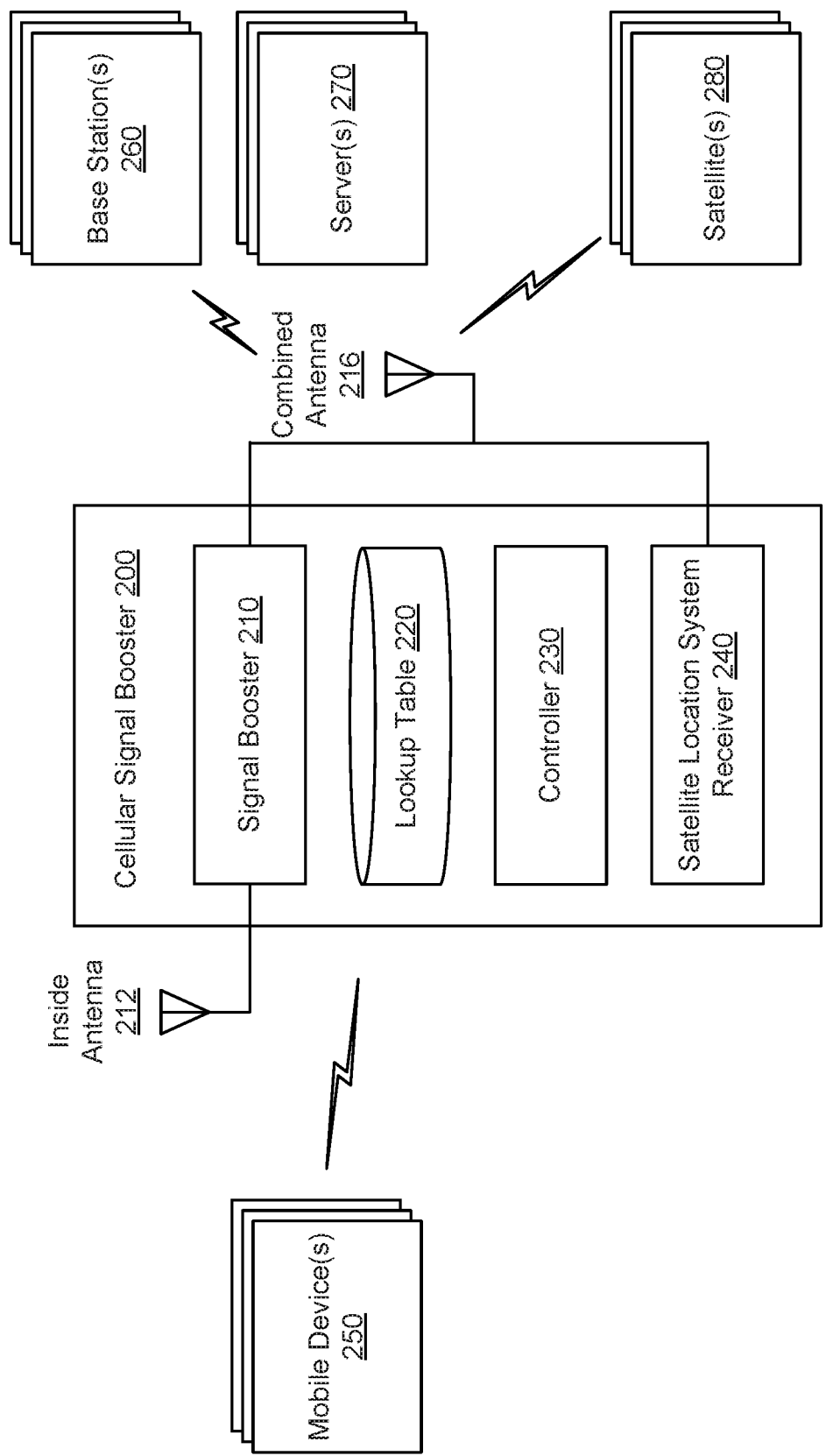
FIG. 2B illustrates a cellular signal booster operable to boost signals in one or more bands that are permitted to be boosted by the cellular signal booster for a current location of the cellular signal booster in accordance with an example.

In an alternative configuration, as shown in FIG. 2B, the cellular signal booster 200 can include a combined antenna 216 (which can replace the outside antenna 214 and the satellite location antenna 242). The combined antenna 216 can be configured to communicate with a base station 260 and one or more satellites 280, such as GPS satellites.

Referring back to FIG. 2A, in one example, the signal booster 210 can receive cellular signals via the outside antenna 214 in a downlink from the base station 260. The cellular signals can be provided to a downlink cellular signal path to amplify and filter the cellular signals. Amplified cellular signals can be transmitted from the signal booster 210 to a mobile device 250 via the inside antenna 212. In another example, the signal booster 210 can receive cellular signals via the inside antenna 212 in an uplink from the mobile device 250. The cellular signals can be provided to an uplink cellular signal path to amplify and filter the cellular signals.

Amplified cellular signals can be transmitted from the signal booster 210 to the base station 260 via the outside antenna 214.

In one example, the cellular signal booster 200 can be purchased and installed at a current location of the cellular signal booster 200. During an installation process, the satellite location system receiver 240 can determine the defined location of the cellular signal booster 200. For example, the satellite location system receiver 240 can receive satellite location system signals (e.g., GPS signals) from the one or more satellites 280 (e.g., GPS satellites) via the satellite location antenna 242. The satellite location system receiver 240 can demodulate the satellite location system signals received from the satellites 280. Using the satellite location system signals, the satellite location system receiver 240 can determine the current location of the cellular signal booster 200.

In one configuration, the cellular signal booster 200 can include a satellite location system receiver configured to determine the defined location of the cellular signal booster 200. The satellite location system receiver can receive a satellite location system signal, which can enable the satellite location system receiver to determine the current location of the cellular signal booster 200. The satellite location system signal can be a GPS signal. Alternatively, the satellite location system signal can be one of: a Global Navigation Satellite System (GLONASS) signal, a Galileo positioning system signal, a BeiDou Navigation Satellite System signal, a Navigation with Indian Constellation (NAVIC) signal or a Quasi-Zenith Satellite System (QZSS) signal. In one example, the satellite location system signal can be a global location satellite system signal or a regional location satellite system signal.

In one example, the controller 230 can include one or more processors and memory. The controller 230 can identify the current location of the cellular signal booster using the satellite location system receiver 240 included in the cellular signal booster 200. In other words, the controller 230 can obtain the current location from the satellite location system receiver 240. The controller 230 can determine one or more bands in which signals are permitted to be boosted by the cellular signal booster 200 based on the current location of the cellular signal booster 200. In one specific example, the controller 230 can use the lookup table 220 in order to identify the one or more bands in which signals are permitted or not permitted to be boosted by the cellular signal booster 200 based on the current location of the cellular signal booster 200.

In one example, the lookup table 220 can store band information that corresponds to a plurality of regions. The band information can indicate bands in which signals are permitted to be amplified for particular regions, as well as bands in which signals are not permitted to be amplified in particular regions. In other words, the band information can indicate which bands are to be turned off for particular regions. The lookup table can be based on a Federal Communications Commission (FCC) public safety re-banding. The lookup table 220 can be generated using an FCC Consumer Booster Standard, which can define which bands are permitted to be boosted for the cellular signal booster.

As an example, for a first region, the lookup table 220 can indicate that the cellular signal booster 200 is restricted to amplifying signals within a particular band (e.g., band 26). As another example, for a second region, the lookup table 220 can indicate that the cellular signal booster 200 is restricted to amplifying signals within a particular band (e.g., band 5).

The controller 230 can identify the current location of the cellular signal booster 200, and then the controller 230 can correlate the current location to a particular region. The controller 230 can look up the band information for that particular region using the lookup table 220. At this point, the controller 230 can configure the signal booster 210 to only boost signals in the one or more bands that are permitted to be boosted by the cellular signal booster 200 for the current location (as indicated by the lookup table 220). In other words, the controller 230 can configure the signal booster 210 to not boost signals in bands which are not permitted for boosting based on the current location of the cellular signal booster 200.

As a non-limiting example, after an installation processor, the controller 230 can determine from the lookup table 220 that the cellular signal booster 200 is permitted to operate in band 26 based on the defined location. In other words, for that defined location, the cellular signal booster 200 can have access to band 26. As another non-limiting example, the controller 230 can determine from the lookup table 220 that the cellular signal booster 200 is not permitted to operate in band 26 based on the defined location, and therefore, the cellular signal booster 200 can revert to using a default band, such as band 5. In other words, based on the defined location, the cellular signal booster 200 can determine to not operate in band 26 and instead operate in band 5. The cellular signal booster 200 may not have access to band 26, for example, when the defined location of the cellular signal booster 200 is in proximity to a Canadian or Mexican border. Instead, in this example, the cellular signal booster 200 can have access to band 5. Therefore, the cellular signal booster 200 can switch between operating in certain bands (e.g., band 26 or band 5) based on the defined location of the cellular signal booster 200.

In one example, the lookup table 220 can be periodically updated. For example, the cellular signal booster 200 can periodically receive updated band information from a server 270, and the updated band information can be stored in the lookup table 220. The band information can be updated when certain regions support new bands. As a non-limiting example, when region X goes from not supporting band 26 to supporting band 26, this can be reflected in the updated band information that is sent to the cellular signal booster 200 from the server 270.

In one configuration, the controller 230 can determine the current location of the cellular signal booster 200 using the satellite location system receiver 240, and the current location of the cellular signal booster 200 can be transmitted to the server 270. The server 270 can access a locally stored lookup table to determine the bands in which the cellular signal booster 200 is permitted to amplify signals. In this configuration, the lookup table can be stored at the server 270, as opposed to being stored locally at the cellular signal booster 200.

In one example, the satellite location system receiver 240 can be a GPS receiver, a GLONASS receiver, a Galileo positioning system receiver, a BeiDou Navigation Satellite System receiver, a NAVIC receiver or a QZSS receiver. The satellite location antenna 242 can be replaced with a GLONASS antenna, a Galileo positioning system antenna, a BeiDou Navigation Satellite System antenna, a NAVIC antenna or a QZSS antenna. The satellites 280 can be GPS satellites, GLONASS satellites, Galileo positioning system satellites, BeiDou Navigation Satellite System satellites, NAVIC satellites or QZSS satellites.

Figure 2C:
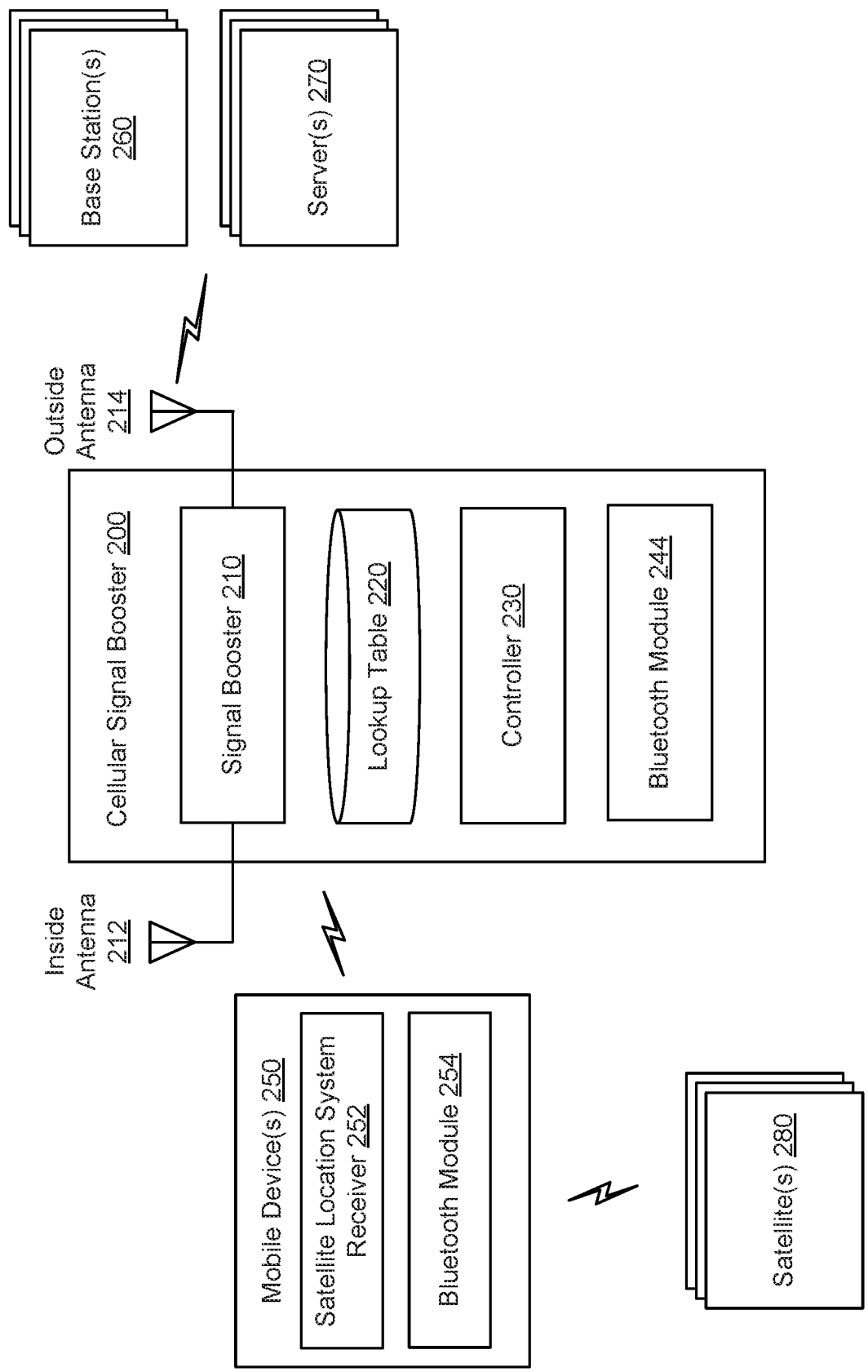
FIG. 2C illustrates a cellular signal booster operable to boost signals in one or more bands that are permitted to be boosted by the cellular signal booster for a current location of the cellular signal booster in accordance with an example.

In another alternative configuration, as shown in FIG. 2C, the cellular signal booster 200 may not include the satellite location system receiver. Rather, the mobile device 250 can include a satellite location system receiver 252, such as a GPS receiver, a GLONASS receiver, a Galileo positioning system receiver, a BeiDou Navigation Satellite System receiver, a NAVIC receiver or a QZSS receiver. The satellite location system receiver 252 can determine the location of the mobile device 250 based on signals received from the one or more satellites 280. Alternatively, the mobile device 250 can determine its location using triangulation or some other type of land-based location system. As another alternative, the mobile device 250 can determine its location based on location information received from a Proximity Services (ProSe) server in a wireless communication system, such as a Third Generation Partnership Project (3GPP) Long Term Evolution (LTE) wireless communication system. Furthermore, since the mobile device 250 is within a defined distance from the cellular signal booster 200 (e.g., 10 feet to 100 feet), the location of the mobile device 250 can be inferred as being the location of the cellular signal booster 200. The mobile device 250 can send its location information to the cellular signal booster 200. The mobile device 250 can send the location information to the cellular signal booster 200 via a Bluetooth connection (or other type of suitable connection) between the mobile device 250 and the cellular signal booster 200. For example, the mobile device 250 can transmits the location information via a Bluetooth module 254 in the mobile device 250, and the cellular signal booster 200 can receive the location information via a separate Bluetooth module 244 in the cellular signal booster 200. Based on the location information received from the mobile device 250, the cellular signal booster 200 can determine its location, and the cellular signal booster 200 can determine one or more bands in which signals are permitted to be boosted by the cellular signal booster 200 based on the location of the cellular signal booster 200.

Figure 3:
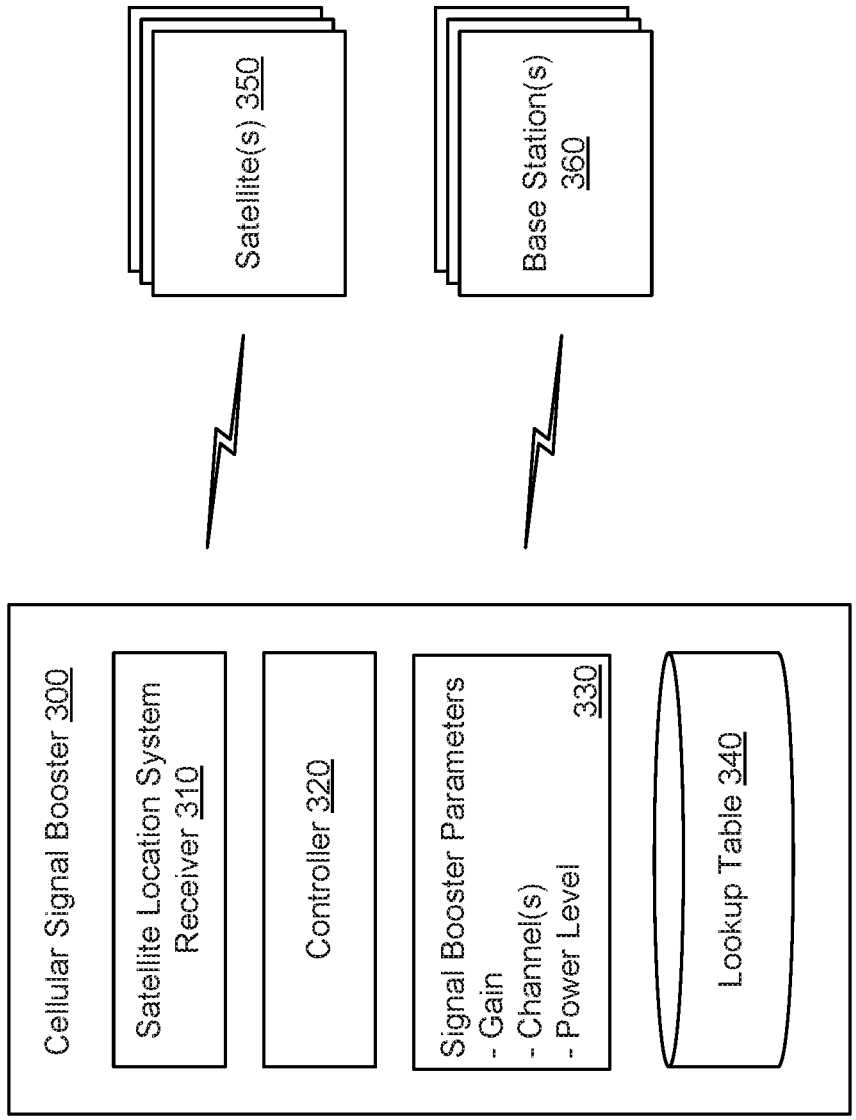
FIG. 3 illustrates a cellular signal booster operable to update signal booster parameters based on a current location of the cellular signal booster in accordance with an example.

FIG. 3 illustrates an example of a cellular signal booster 300 operable to update signal booster parameters based on a current location of the cellular signal booster 300. The cellular signal booster 300 can include a satellite location system receiver 310, such as a global positioning system (GPS) receiver, and a controller 320. The satellite location system receiver 310 can communicate with one or more satellites 350 in order to determine a current location of the cellular signal booster 300. The controller 320 can include one or more processors and memory that function to perform various functions for the cellular signal booster 300. The cellular signal booster 300 can be associated with various signal booster parameters 330, such as gain, channels and power levels. For example, the cellular signal booster 300 can be configured with a default set of signal booster parameters, but the signal booster parameters 330 can be modified over time based on various conditions. In addition, the cellular signal booster 300 can include a lookup table 340. As explained in further detail below, the lookup table 340 can be utilized to determine optimal signal booster parameters 330 for the cellular signal booster 300.

In one configuration, the controller 320 can identify the current location of the cellular signal booster 300 via the satellite location system receiver 310. The controller 320 can identify one or more predefined signal booster parameters that correspond to the current location of the cellular signal booster 300. More specifically, the controller 320 can access the lookup table 340 to identify the one or more predefined signal booster parameters that correspond to the current location of the cellular signal booster 300. In other words, the lookup table 340 can store predefined signal booster parameters for a plurality of locations. Based on information obtained from the lookup table 30, the controller 320 can update one or more existing signal booster parameters 330 associated with the cellular signal booster 300 to reflect the one or more predefined signal booster parameters that correspond to the current location of the cellular signal booster 300. The signal booster parameters 330 that can be modified based on the cellular signal booster's current location include a gain of the cellular signal booster 300, a channel associated with the cellular signal booster 300, and a power level associated with the cellular signal booster 300.

In one configuration, the cellular signal booster 300 can be in communication with a base station 360. The cellular signal booster 300 can receive signals from the base station 360. Based on a signal strength associated with the signals received from the base station, a defined distance between the cellular signal booster 300 and the base station 360 can be determined. The cellular signal booster 300 can select one or more signal booster parameters 300 based on the defined distance between the cellular signal booster 300 and the base station 360. The one or more signal booster parameters 330 can include the gain of the cellular signal booster 300, the channel associated with the cellular signal booster 300, and the power level associated with the cellular signal booster 300. In this configuration, the signal booster parameters 330 can be selected based on a proximity or defined distance between the cellular signal booster 300 and the base station 360 rather than based on the lookup table 340.

Figure 4:
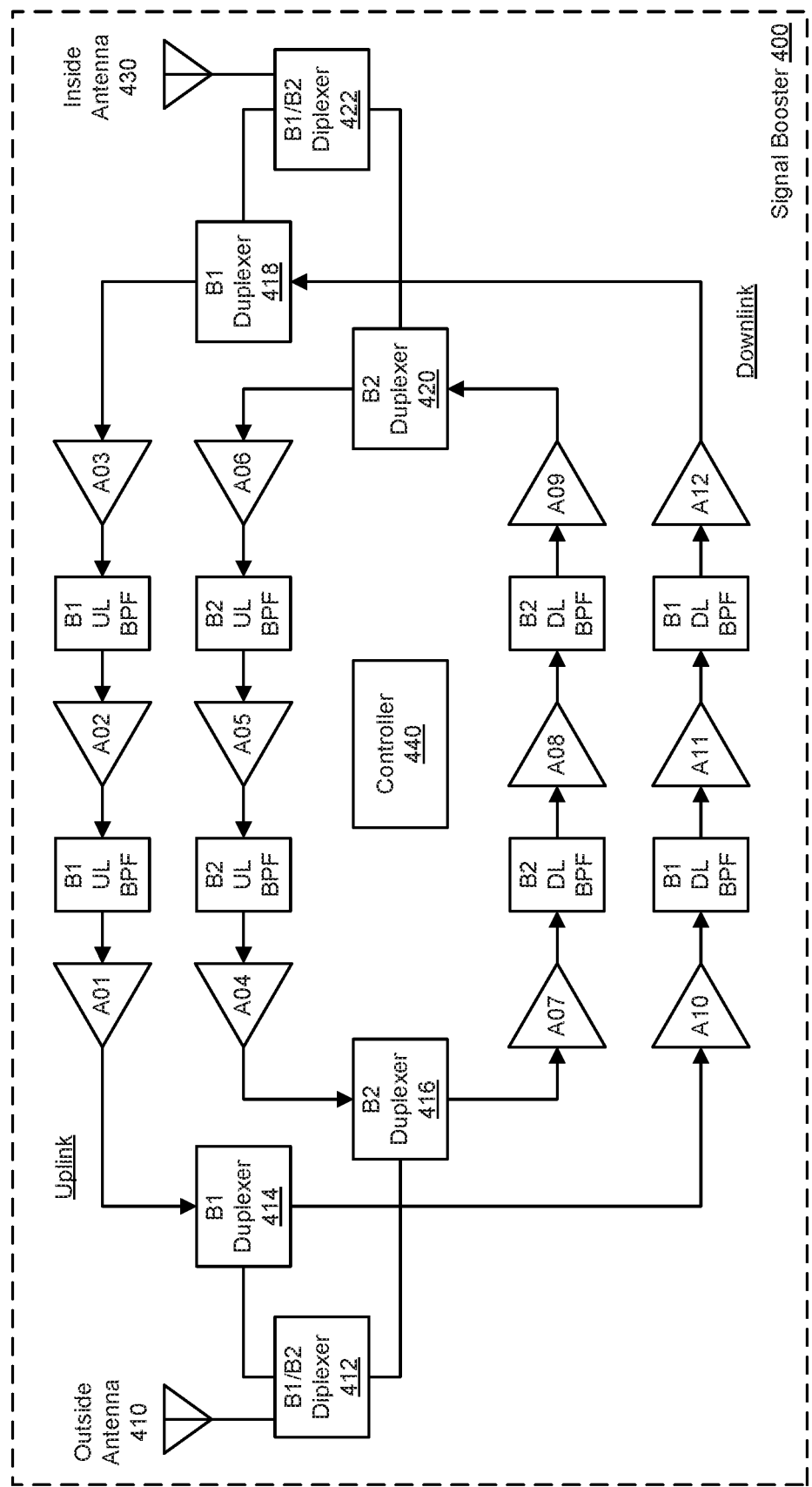
FIG. 4 illustrates a cellular signal booster configured to amplify uplink (UL) and downlink (DL) signals using one or more downlink signal paths and one or more uplink signal paths in accordance with an example.

FIG. 4 illustrates an exemplary bi-directional wireless signal booster 400 configured to amplify uplink (UL) and downlink (DL) signals using a separate signal path for each UL frequency band and DL frequency band and a controller 440. An outside antenna 410, or an integrated node antenna, can receive a downlink signal. For example, the downlink signal can be received from a base station (not shown). The downlink signal can be provided to a first B1/B2 diplexer 412, wherein B1 represents a first frequency band and B2 represents a second frequency band. The first B1/B2 diplexer 412 can create a B1 downlink signal path and a B2 downlink signal path. Therefore, a downlink signal that is associated with B1 can travel along the B1 downlink signal path to a first B1 duplexer 414, or a downlink signal that is associated with B2 can travel along the B2 downlink signal path to a first B2 duplexer 416. After passing the first B1 duplexer 414, the downlink signal can travel through a series of amplifiers (e.g., A10, A11 and A12) and downlink band pass filters (BPF) to a second B1 duplexer 418. Alternatively, after passing the first B2 duplexer 416, the downlink can travel through a series of amplifiers (e.g., A07, A08 and A09) and downlink band pass filters (BFF) to a second B2 duplexer 420. At this point, the downlink signal (B1 or B2) has been amplified and filtered in accordance with the type of amplifiers and BPFs included in the bi-directional wireless signal booster 400. The downlink signals from the second B1 duplexer 418 or the second B2 duplexer 420, respectively, can be provided to a second B1/B2 diplexer 422. The second B1/B2 diplexer 422 can provide an amplified downlink signal to an inside antenna 430, or an integrated device antenna. The inside antenna 430 can communicate the amplified downlink signal to a wireless device (not shown), such as a mobile phone.

In one example, the inside antenna 430 can receive an uplink (UL) signal from the wireless device. The uplink signal can be provided to the second B1/B2 diplexer 422. The second B1/B2 diplexer 422 can create a B1 uplink signal path and a B2 uplink signal path. Therefore, an uplink signal that is associated with B1 can travel along the B1 uplink signal path to the second B1 duplexer 418, or an uplink signal that is associated with B2 can travel along the B2 uplink signal path to the second B2 duplexer 422. After passing the second B1 duplexer 418, the uplink signal can travel through a series of amplifiers (e.g., A01, A02 and A03) and uplink band pass filters (BPF) to the first B1 duplexer 414. Alternatively, after passing the second B2 duplexer 420, the uplink signal can travel through a series of amplifiers (e.g., A04, A05 and A06) and uplink band pass filters (BPF) to the first B2 duplexer 416. At this point, the uplink signal (B1 or B2) has been amplified and filtered in accordance with the type of amplifiers and BFFs included in the bi-directional wireless signal booster 400. The uplink signals from the first B1 duplexer 14 or the first B2 duplexer 16, respectively, can be provided to the first B1/B2 diplexer 12. The first B1/B2 diplexer 12 can provide an amplified uplink signal to the outside antenna 10. The outside antenna can communicate the amplified uplink signal to the base station.

In one example, the bi-directional wireless signal booster 400 can be a 6-band booster. In other words, the bi-directional wireless signal booster 400 can perform amplification and filtering for downlink and uplink signals having a frequency in bands B1, B2, B3 B4, B5 and/or B6.

In one example, the bi-directional wireless signal booster 400 can use the duplexers to separate the uplink and downlink frequency bands, which are then amplified and filtered separately. A multiple-band cellular signal booster can typically have dedicated radio frequency (RF) amplifiers (gain blocks), RF detectors, variable RF attenuators and RF filters for each uplink and downlink band.

Figure 5:
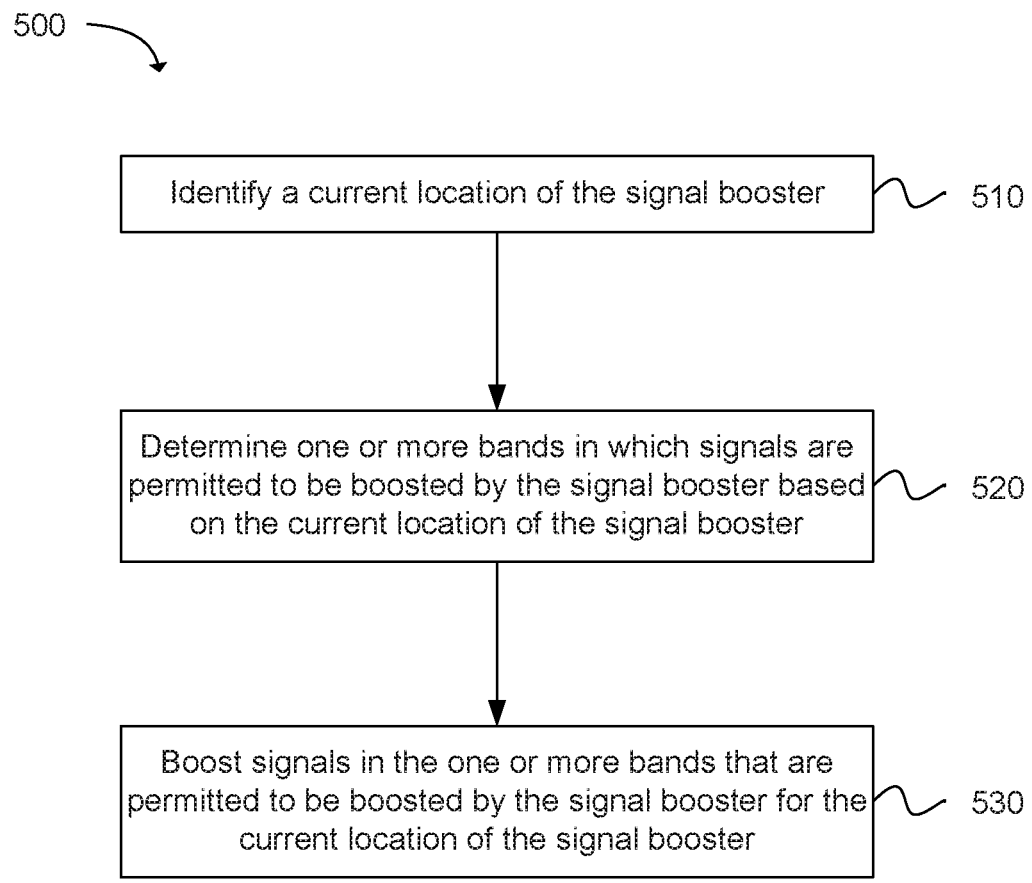
FIG. 5 illustrates functionality of a signal booster in accordance with an example.

FIG. 5 illustrates functionality 500 of a signal booster. The signal booster can identify a current location of the signal booster, as in block 510. The signal booster can determine one or more bands in which signals are permitted to be boosted by the signal booster based on the current location of the signal booster, as in block 520. The signal booster can boost signals in the one or more bands that are permitted to be boosted by the signal booster for the current location of the signal booster, as in block 530.

Figure 6:
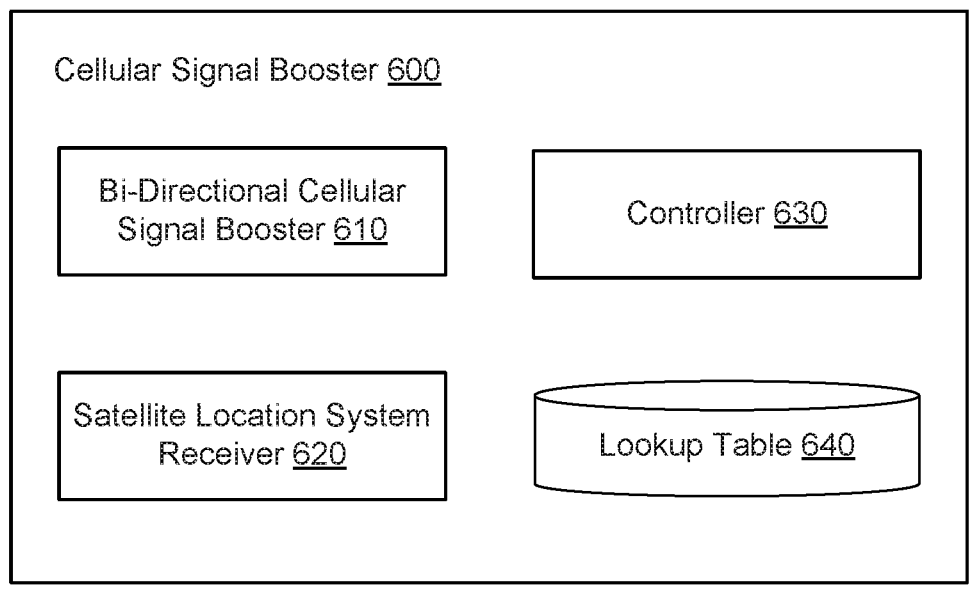
FIG. 6 illustrates a cellular signal booster in accordance with an example.

FIG. 6 illustrates a cellular signal booster 600. The cellular signal booster 600 can include a bi-directional cellular signal booster 610, a satellite location system receiver 620, a controller 630 and a lookup table 640. The bi-directional cellular signal booster 610 can boost cellular signals. The satellite location system receiver 620 can detect a current location of the cellular signal booster 600. The controller 630 can comprise one or more processors and memory configured to: access the lookup table 640 to identify one or more bands in which cellular signals are permitted to be boosted by the cellular signal booster 600 with respect to the current location of the cellular signal booster 600, and boost cellular signals in the one or more bands that correspond to the current location of the cellular signal booster 600.

Figure 7:
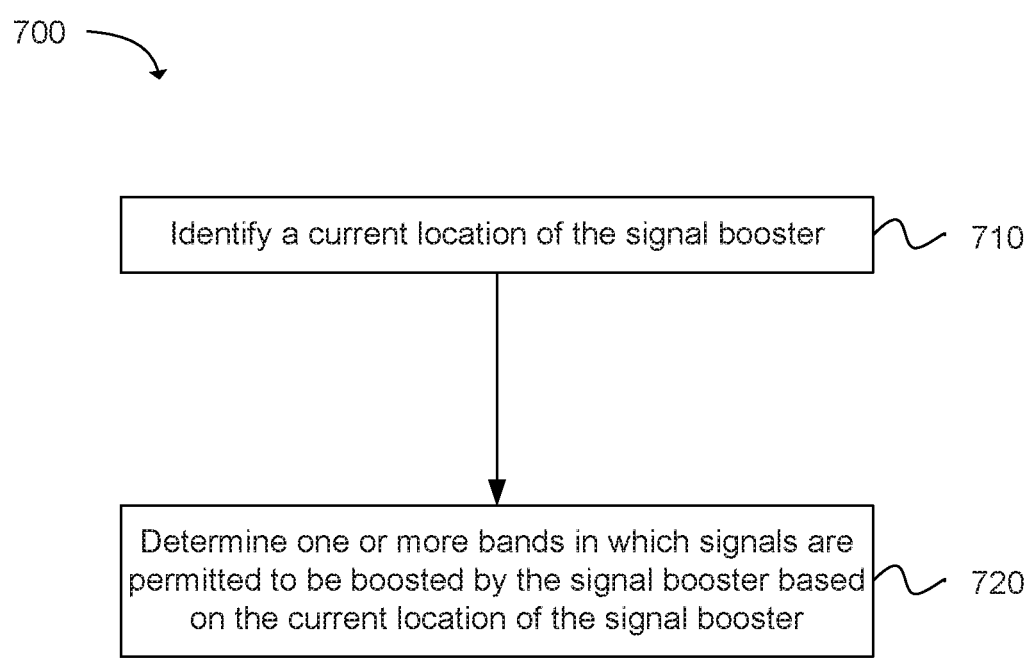
FIG. 7 illustrates functionality of a signal booster operable to transmit amplified signals in accordance with an example.

FIG. 7 illustrates functionality 700 of a signal booster operable to transmit amplified signals. The signal booster can identify a current location of the signal booster, as in block 710. The signal booster can determine one or more bands in which signals are permitted to be boosted by the signal booster based on the current location of the signal booster, as in block 720.

Figure 8:
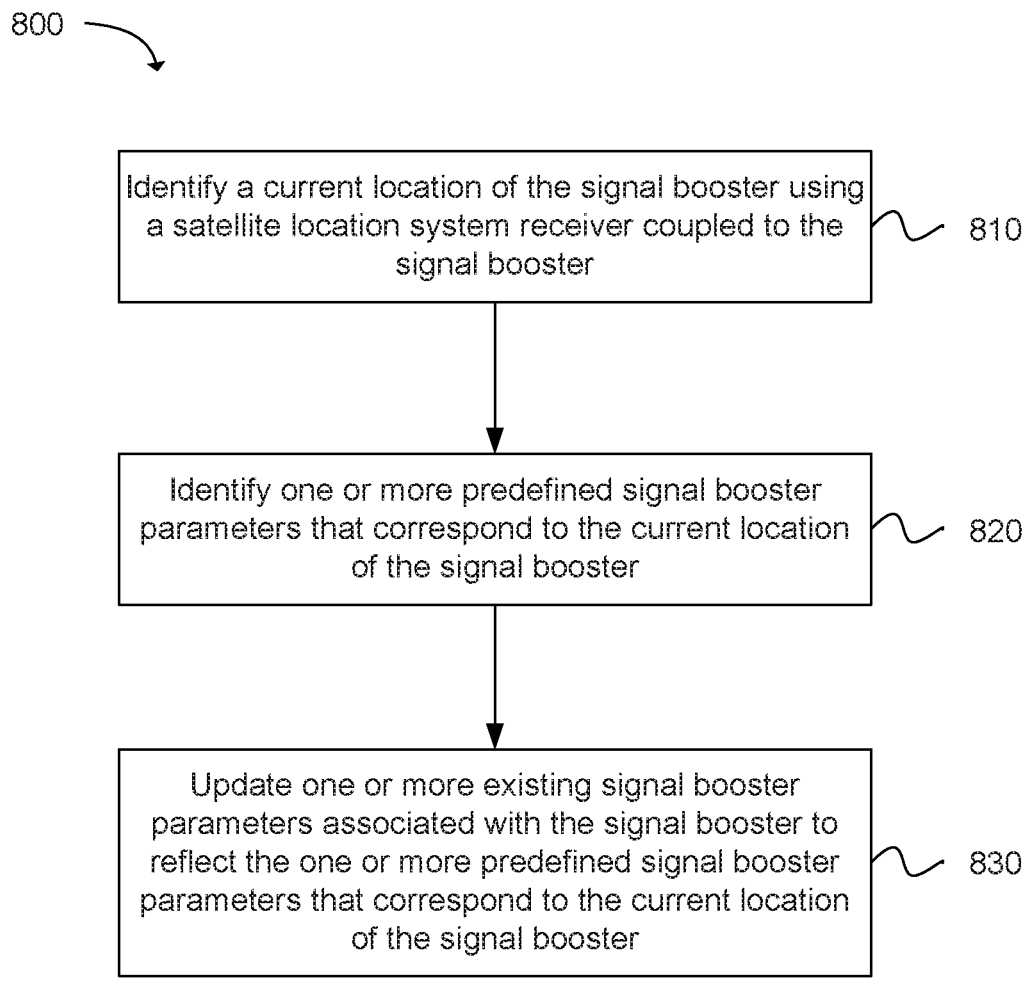
FIG. 8 illustrates functionality of a signal booster in accordance with an example.

FIG. 8 illustrates functionality 800 of a signal booster. The signal booster can identify a current location of the signal booster using a satellite location system receiver coupled to the signal booster, as in block 810. The signal booster can identify one or more predefined signal booster parameters that correspond to the current location of the signal booster, as in block 820. The signal booster can update one or more existing signal booster parameters associated with the signal booster to reflect the one or more predefined signal booster parameters that correspond to the current location of the signal booster, as in block 830.

Figure 9:
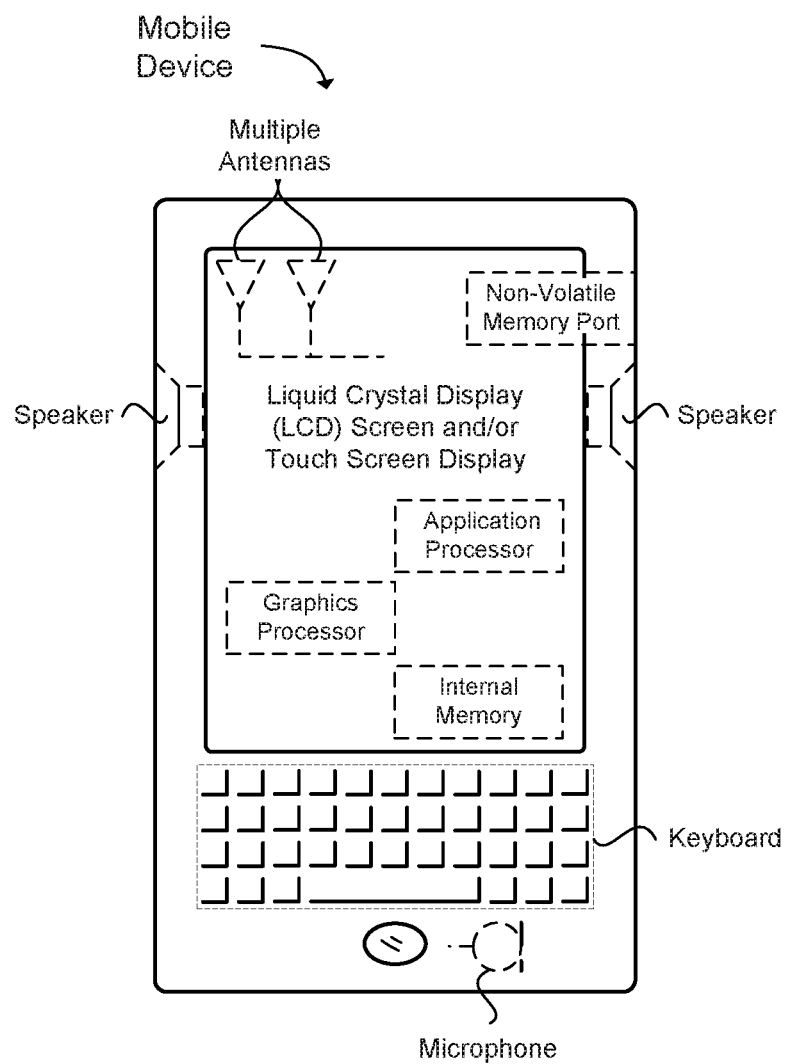
FIG. 9 illustrates a wireless device in accordance with an example.

FIG. 9 provides an example illustration of the wireless device, such as a user equipment (UE), a mobile station (MS), a mobile communication device, a tablet, a handset, a wireless transceiver coupled to a processor, or other type of wireless device. The wireless device can include one or more antennas configured to communicate with a node or transmission station, such as an access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 9 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes a signal booster, comprising one or more processors and memory configured to: identify a current location of the signal booster; determine one or more bands in which signals are permitted to be boosted by the signal booster based on the current location of the signal booster; and boost signals in the one or more bands that are permitted to be boosted by the signal booster for the current location of the signal booster.

Example 2 includes the signal booster of Example 1, wherein the one or more processors and memory are further configured to: determine the one or more bands in which signals are permitted to be boosted using a lookup table, wherein the lookup table indicates the one or more bands in view of the current location of the signal booster.

Example 3 includes the signal booster of any of Examples 1 to 2, wherein the lookup table is based on a Federal Communications Commission (FCC) public safety re-banding.

Example 4 includes the signal booster of any of Examples 1 to 3, wherein the one or more processors and memory are further configured to: periodically update the lookup table based on data received from a server.

Example 5 includes the signal booster of any of Examples 1 to 4, wherein the one or more processors and memory are further configured to: generate the lookup table based on the Federal Communications Commission (FCC) Consumer Booster Standard, wherein the FCC Consumer Booster Standard defines which bands are permitted to be boosted for a signal booster.

Example 6 includes the signal booster of any of Examples 1 to 5, wherein the one or more processors and memory are further configured to: boost signals in band 26 (B26) based on the current location of the signal booster; or boost signals in band 5 (B5) based on the current location of the signal booster.

Example 7 includes the signal booster of any of Examples 1 to 6, wherein the one or more processors and memory are further configured to: determine the one or more bands in which to boost signals during an installation process of the signal booster.

Example 8 includes the signal booster of any of Examples 1 to 7, wherein the signals in the one or more bands are permitted to be boosted based on a government license.

Example 9 includes the signal booster of any of Examples 1 to 8, further comprising a bi-directional signal booster configured to amplify cellular signals and retransmit amplified cellular signals.

Example 10 includes the signal booster of any of Examples 1 to 9, further comprising: an outside antenna to receive a downlink signal from a base station, wherein the downlink signal is associated with the one or more bands in which signals are permitted to be boosted; a downlink signal path that includes one or more amplifiers and one or more band pass filters, wherein the downlink signal is amplified and filtered via the downlink signal path; and an inside antenna to transmit the downlink signal that has been amplified and filtered to a mobile device.

Example 11 includes the signal booster of any of Examples 1 to 10, further comprising: an inside antenna to receive an uplink signal from a mobile device, wherein the uplink signal is associated with the one or more bands in which signals are permitted to be boosted; an uplink signal path that includes one or more amplifiers and one or more band pass filters, wherein the uplink signal is amplified and filtered via the uplink signal path; and an outside antenna to transmit the uplink signal that has been amplified and filtered to a base station.

Example 12 includes the signal booster of any of Examples 1 to 11, wherein the signal booster is configured to boost signals in up to six bands.

Example 13 includes the signal booster of any of Examples 1 to 12, wherein the one or more processors and memory are configured to identify the current location of the signal booster based on location information received from a mobile device that is in communication with the signal booster, wherein the mobile device is configured to determine the location information using a location satellite system receiver in the mobile device.

Example 14 includes a cellular signal booster, comprising: a bi-directional cellular signal booster configured to boost cellular signals; a satellite location system receiver configured to detect a current location of the cellular signal booster; and a controller comprising one or more processors and memory configured to: access a lookup table to identify one or more bands in which cellular signals are permitted to be boosted by the cellular signal booster with respect to the current location of the cellular signal booster; and boost cellular signals in the one or more bands that correspond to the current location of the cellular signal booster.

Example 15 includes the cellular signal booster of Example 14, wherein the controller comprising the one or more processors and memory is further configured to: determine to not boost cellular signals in one or more bands that are not indicated in the lookup table with respect to the current location of the cellular signal booster.

Example 16 includes the cellular signal booster of any of Examples 14 to 15, wherein the controller comprising the one or more processors and memory is further configured to: periodically update the lookup table based on data received from a server.

Example 17 includes the cellular signal booster of any of Examples 14 to 16, wherein the controller comprising the one or more processors and memory is further configured to: determine from the lookup table to boost signals in band 26 (B26) based on the current location of the cellular signal booster; or determine from the lookup table to boost signals in band 5 (B5) based on the current location of the cellular signal booster.

Example 18 includes the cellular signal booster of any of Examples 14 to 17, wherein the controller comprising the one or more processors and memory is further configured to: generate the lookup table based on the Federal Communications Commission (FCC) Consumer Booster Standard, wherein the FCC Consumer Booster Standard defines which bands are permitted to be boosted for a cellular signal booster.

Example 19 includes the cellular signal booster of any of Examples 14 to 18, wherein the controller comprising the one or more processors and memory is further configured to: access the lookup table and determine the one or more bands in which to boost signals during an installation process of the cellular signal booster.

Example 20 includes a signal booster operable to transmit amplified signals, the signal booster comprising one or more processors and memory configured to: identify a current location of the signal booster; and determine one or more bands in which signals are permitted to be boosted by the signal booster based on the current location of the signal booster.

Example 21 includes the signal booster of Example 20, wherein the one or more processors and memory are further configured to: determine the one or more bands in which signals are permitted to be boosted using a lookup table stored on the signal booster.

Example 22 includes the signal booster of any of Examples 20 to 21, wherein the one or more processors and memory are further configured to: boost signals in the one or more bands that are permitted to be boosted by the signal booster for the current location of the signal booster.

Example 23 includes the signal booster of any of Examples 20 to 22, further comprising a signal path that includes one or more amplifiers and one or more band pass filters, wherein the signal path is operable to boost signals in the one or more bands permitted to be boosted by the signal booster.

Example 24 includes a signal booster, comprising one or more processors and memory configured to: identify a current location of the signal booster using a satellite location system receiver coupled to the signal booster; identify one or more predefined signal booster parameters that correspond to the current location of the signal booster; and update one or more existing signal booster parameters associated with the signal booster to reflect the one or more predefined signal booster parameters that correspond to the current location of the signal booster.

Example 25 includes the signal booster of Example 24, wherein the one or more signal booster parameters that are modified include a gain of the signal booster, a channel associated with the signal booster, and a power level associated with the signal booster.

Example 26 includes the signal booster of any of Examples 24 to 25, wherein the one or more processors and memory are further configured to: access a lookup table stored on the signal booster to identify the one or more predefined signal booster parameters that correspond to the current location of the signal booster.

Example 27 includes the signal booster of any of Examples 24 to 26, wherein the one or more processors and memory are further configured to: identify the one or more predefined signal booster parameters based on a defined distance between the signal booster and a base station, wherein the one or more predefined signal booster parameters include a gain of the signal booster, a channel associated with the signal booster, and a power level associated with the signal booster.

Example 28 includes the signal booster of any of Examples 24 to 27, wherein the satellite location system receiver is one of: a global positioning system (GPS) receiver, a Global Navigation Satellite System (GLONASS) receiver, a Galileo positioning system receiver, a BeiDou Navigation Satellite System receiver, a Navigation with Indian Constellation (NAVIC) receiver or a Quasi-Zenith Satellite System (QZSS) receiver.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention.

What is claimed is:

1. A signal booster, comprising
an uplink signal path that includes one or more amplifiers and one or more uplink band pass filters operable to boost uplink signals; and
a downlink signal path that includes one or more amplifiers and one or more downlink band pass filters operable to boost downlink signals; and
one or more processors and memory configured to:
sense, from a wireless device, one or more bands being transmitted on by the wireless device using radio frequency (RF) detection to measure and identify the one or more bands, wherein the wireless device is configured to operate on selected bands based on a current location of the wireless device; and
boost the uplink signals or the downlink signals in the one or more bands sensed using the RF detection on one or more of the uplink signal path or the downlink signal path of the signal booster, wherein the uplink signals or the downlink signals on the one or more bands used by the wireless device are permitted to be boosted by the signal booster for the current location of the wireless device, and based on one or more predefined signal booster parameters that are defined for the current location in accordance with a public safety re-banding,
wherein the signal booster further comprises a signal path that includes one or more amplifiers and one or more band pass filters, wherein the signal path is operable to boost signals in the one or more bands which are sensed using the RF detection and permitted to be boosted by the signal booster.

2. The signal booster of claim 1, wherein the one or more processors and memory are further configured to: confirm that the one or more bands are permitted to be boosted, based on a public safety re-banding, using a lookup table, wherein the lookup table indicates the one or more bands in view of the current location of the wireless device.

3. The signal booster of claim 2, wherein the lookup table is based on a Federal Communications Commission (FCC) public safety re-banding.

4. The signal booster of claim 2, wherein the one or more processors and memory are further configured to: periodically update the lookup table based on data received from a server.

5. The signal booster of claim 2, wherein the one or more processors and memory are further configured to: generate the lookup table based on the Federal Communications Commission (FCC) Consumer Booster Standard, wherein the FCC Consumer Booster Standard defines which bands are permitted to be boosted for a signal booster.

6. The signal booster of claim 1, wherein the one or more processors and memory are further configured to:
boost signals in band 26 (B26) based on the current location of the wireless device; or
boost signals in band 5 (B5) based on the current location of the wireless device.

7. The signal booster of claim 1, wherein the one or more processors and memory are further configured to: identify the one or more bands in which to boost signals during an installation process of the signal booster, based on the public safety re-banding.

8. The signal booster of claim 1, wherein the signals in the one or more bands are permitted to be boosted based on a government license according to the public safety re-banding.

9. The signal booster of claim 1, further comprising a bi-directional signal booster configured to amplify cellular signals and retransmit amplified cellular signals.

10. The signal booster of claim 1, further comprising:
an outside antenna to receive a downlink signal from a base station, wherein the downlink signal is associated with the one or more bands in which signals are permitted to be boosted, based on the public safety re-banding;
the downlink signal path that includes the one or more amplifiers and the one or more downlink band pass filters, wherein the downlink signal is amplified and filtered via the downlink signal path; and an inside antenna to transmit the downlink signal that has been amplified and filtered to a wireless device.

11. The signal booster of claim 1, further comprising:
an inside antenna to receive an uplink signal from a wireless device, wherein the uplink signal is associated with the one or more bands in which signals are permitted to be boosted, based on the public safety re-banding;
the uplink signal path that includes the one or more amplifiers and the one or more uplink band pass filters, wherein the uplink signal is amplified and filtered via the uplink signal path; and an outside antenna to transmit the uplink signal that has been amplified and filtered to a base station.

12. The signal booster of claim 1, wherein the signal booster is configured to boost signals in up to six bands.

13. The signal booster of claim 1, wherein the one or more processors and memory are configured to identify the current location of the signal booster based on location information received from a wireless device that is in communication with the signal booster, wherein the wireless device is configured to determine the location information using a location satellite system receiver in the wireless device.

14. A cellular signal booster, comprising:
a bi-directional cellular signal booster configured to boost cellular signals for a wireless device, wherein the signal booster includes a signal path that includes one or more amplifiers and one or more bandpass filters;
a controller comprising one or more processors and memory configured to:
sense one or more bands being transmitted on by the wireless device using radio frequency (RF) detection to measure and identify the one or more bands, wherein the signal path is operable to boost signals in the one or more bands which are sensed using the RF detection and permitted to be boosted by the signal booster, and the wireless device is configured to operate on selected bands based on a current location of the wireless device; and
boost cellular signals in the one or more bands sensed using the RF detection, wherein the one or more bands used by the wireless device are permitted to be boosted by the signal booster for the current location of the wireless device, and based on one or more predefined signal booster parameters that are defined for the current location in accordance with a public safety re-banding.

15. The cellular signal booster of claim 14, wherein the controller comprising the one or more processors and memory is further configured to: determine to not boost cellular signals in one or more bands that are not permitted to be boosted by the signal booster for the current location of the wireless device, based on the public safety re-banding.

16. The signal booster of claim 14, wherein the one or more processors and memory are further configured to: periodically update the lookup table based on data received from a server based on the public safety re-banding.

17. The signal booster of claim 14, wherein the one or more processors and memory are further configured to:
determine from the lookup table to boost signals in band 26 (B26) based on the current location of the cellular signal booster; or determine from the lookup table to boost signals in band 5 (B5) based on the current location of the cellular signal booster.

18. The signal booster of claim 14, wherein the one or more processors and memory are further configured to: generate the lookup table based on the public safety re-banding in the Federal Communications Commission (FCC) Consumer Booster Standard, wherein the FCC Consumer Booster Standard defines which bands are permitted to be boosted for a cellular signal booster.

19. The signal booster of claim 14, wherein the one or more processors and memory are further configured to: access the lookup table and determine the one or more bands in which to boost signals during an installation process of the cellular signal booster, based on the public safety re-banding.

20. A signal booster operable to transmit amplified signals, the signal booster comprising one or more processors and memory configured to:
receive, at the signal booster, a current location of a wireless device from the wireless device via a BLUETOOTH connection between the wireless device and the signal booster, wherein the current location of the wireless device is used to infer a current location of the signal booster;
determine one or more bands in which signals are permitted to be boosted by the signal booster based on the current location of the signal booster, and based on one or more predefined signal booster parameters that are defined for the current location in accordance with a public safety re-banding; and
sense, from the wireless device, the one or more bands being transmitted on by the wireless device using radio frequency (RF) detection to measure and identify the one or more bands,
wherein the signal booster further comprises a signal path that includes one or more amplifiers and one or more band pass filters, wherein the signal path is operable to boost signals in the one or more bands which are sensed using the RF detection and permitted to be boosted by the signal booster.

21. The signal booster of claim 20, wherein the one or more processors and memory are further configured to: determine the one or more bands in which signals are permitted to be boosted using a lookup table stored on the signal booster, based on the public safety re-banding.

22. The signal booster of claim 20, wherein the one or more processors and memory are further configured to: boost signals in the one or more bands that are permitted to be boosted by the signal booster for the current location of the signal booster, based on the public safety re-banding.

23. A signal booster, comprising one or more processors and memory configured to:
identify a current location of the signal booster based on location information received from a wireless device in communication with the signal booster, wherein the location information is derived using a satellite location system receiver of the wireless device;
identify one or more predefined signal booster parameters that correspond to the current location of the signal booster, wherein the predefined signal booster parameters are defined for the current location in accordance with a public safety re-banding;
update one or more existing signal booster parameters associated with the signal booster to reflect the one or more predefined signal booster parameters that correspond to the current location of the signal booster;
sense, from the wireless device, one or more bands being transmitted on by the wireless device using radio frequency (RF) detection to measure and identify the one or more bands;
boost signals in the one or more bands that are sensed using the RF detection and permitted to be boosted by the signal booster for the current location of the signal booster; and
access a lookup table stored on the signal booster to identify the one or more predefined signal booster parameters that correspond to the current location of the signal booster, wherein the lookup table is based on the public safety re-banding.

24. The signal booster of claim 23, wherein the one or more signal booster parameters that are modified include a gain of the signal booster, a channel associated with the signal booster, and a power level associated with the signal booster.

25. The signal booster of claim 23, wherein the one or more processors and memory are further configured to: identify the one or more predefined signal booster parameters based on a defined distance between the signal booster and a base station, wherein the one or more predefined signal booster parameters include a gain of the signal booster, a channel associated with the signal booster, and a power level associated with the signal booster.

26. The signal booster of claim 23, wherein the satellite location system receiver is one of: a global positioning system (GPS) receiver, a Global Navigation Satellite System (GLONASS) receiver, a Galileo positioning system receiver, a BeiDou Navigation Satellite System receiver, a Navigation with Indian Constellation (NAVIC) receiver or a Quasi-Zenith Satellite System (QZSS) receiver.

* * * * *